Horace Baker's
Improved machine for Raking and Loading or elevating Hay, grain, &c.
117033
PATENTED JUL 18 1871.
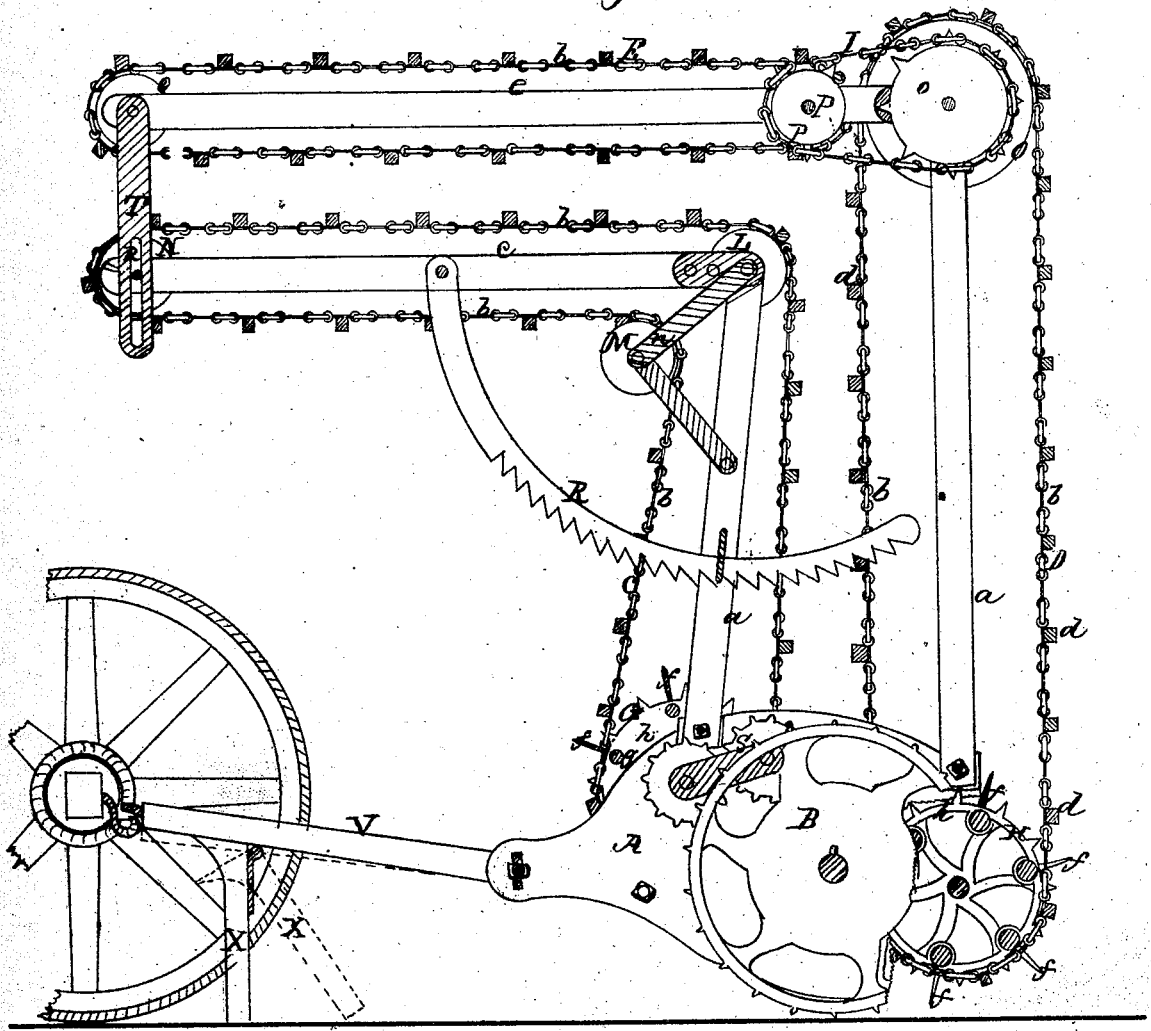
Fig: 1.
Witnesses:
J. C. buy
E. J. Brown
Horace Baker,
By his atty,
J. S. Brown,
2 Sheets
Sheet 1

117033
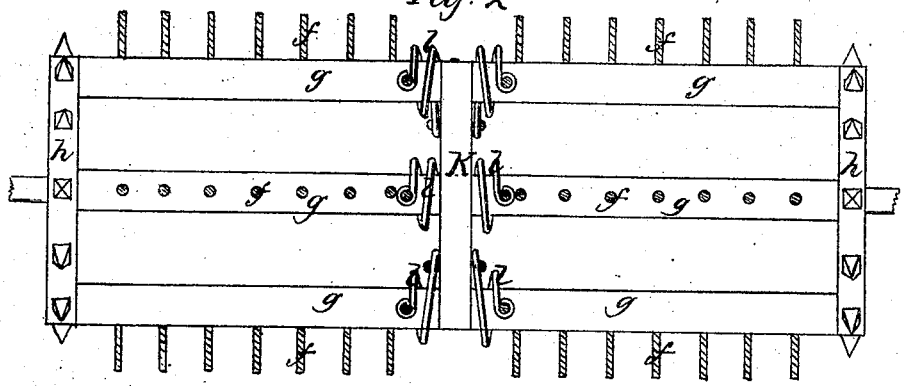
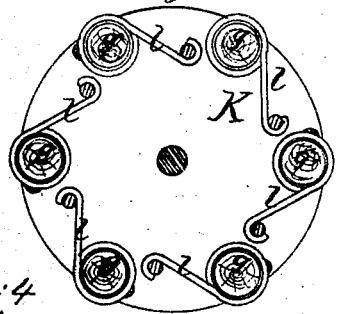
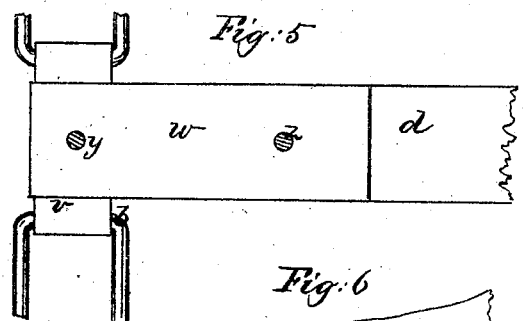
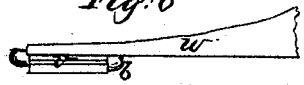
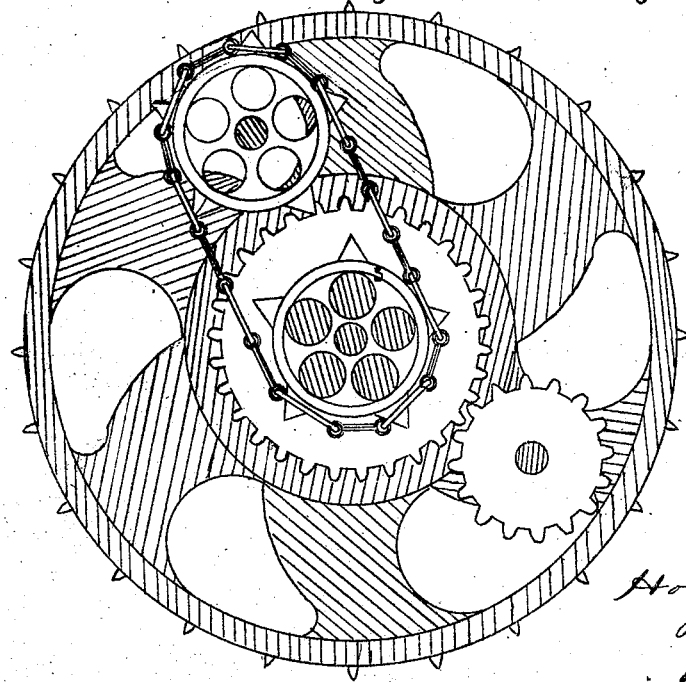

117,033

UNITED STATES PATENT OFFICE.

HORACE BAKER, OF CORTLAND, NEW YORK.

IMPROVEMENT IN HAY-LOADERS.

Specification forming part of Letters Patent No. 117,033, dated July 18, 1871.

*To all whom it may concern:*

Be it known that I, HORACE BAKER, of Cortland, in the county of Cortland and State of New York, have invented an Improved Machine for Raking and Loading or Elevating Hay, Grain, and other similar substances; and I do hereby declare that the following is a full and exact description thereof, reference being had to the accompanying drawing making part of this specification—

Figure 1 being a side elevation of the raking and loading-machine; Fig. 2, a side view of one of the revolving rakes or gatherers; Fig. 3, a transverse section thereof in a plane indicated by the line $x\,x$, Fig. 2; Fig. 4, a cross-section of one of the revolving rake-heads, showing a modification of the mode of giving elasticity to the teeth; Fig. 5, a plan, full size, showing the improved construction of the endless aprons; Fig. 6, a side view of the same as in Fig. 5; Fig. 7, a view showing a modified mode of gearing from the driving-wheels to the endless aprons.

Like letters designate corresponding parts in all of the figures.

The improvements embraced in this invention are founded upon the main features of the hay-loader or elevator for which Letters Patent of the United States were granted to me on the 3d day of July, 1866, and since reissued. In this machine, as in that, I employ two or more endless aprons, operating together, to take up and elevate or convey the hay or grain to the wagon, cart, or other place desired, the action thereof being upon the same principle and substantially in the same manner as in that machine; but in this machine I have somewhat modified the arrangement and have added some features, which render the whole machine more complete and more efficient in its operation.

My first improvement consists in the employment of revolving rakes, or sets of rake-teeth or gatherers, in combination with endless aprons, co-operating to take up and elevate or convey the hay or grain; or, as the essential part of the feature, the employment of a revolving rake or sets of gathering-teeth in connection with the rear apron of the co-operating pair, for the purpose of raking or gathering up the loose hay or straw without waste, more particularly where the hay is short or fine; and, in order to prevent obstruction and injury to the parts on uneven or rough ground, these gathering teeth are made yielding and elastic, either of themselves or in position.

In the drawing, C represents the front and D the rear apron. The endless chains $b\,b$ of these endless aprons, at the bottom, pass around rag-wheels $h\,h$, the respective pairs of which for each apron are secured to a revolving shaft, receiving its proper motion from the driving-wheels B B. These revolving rag-wheels and their respective shafts, together with an intermediate disk or wheel, K, (one or more,) on each shaft, and having the same or nearly the same diameter as the rag-wheels, conveniently and suitably compose the frame-work of the respective revolving rakes, since it is preferable to have the rakes revolve within and concentrically with the lower turns of the endless aprons. To complete the structure for the rakes a series of rake-heads or rollers, $g\,g$, extend from one rag-wheel to the other of each pair, or to the intermediate wheel K, when used, parallel and concentric with their shaft, and have their bearings in the said wheels near their peripheries. From each head or roller $g$ a suitable number of short teeth, $f\,f$, projects outward, in relation to the whole rake, substantially as represented. The required yielding elasticity to be given to the teeth may be simply and effectually obtained by allowing a vibratory movement to each rake-head or roller $g$ in its bearings and attaching a spring, $l$, to one end and to one of the rag-wheels, or, more conveniently, to the intermediate disk K, as shown in Figs. 2 and 3, the arrangement being such that the springs ordinarily hold the rake-heads in position to project their teeth $f\,f$ radially outward from the rake, or nearly so, and that the whole head yields to an obstruction. By this construction the teeth themselves may be rigid; or each tooth may have a spring-coil around its head, as shown in Fig. 4, or otherwise be itself elastic. Where the endless aprons turn around their rag-wheels, at the bottom, these rake-teeth project beyond them and gather from the ground any loose hay which the said endless aprons may fail to take up; but as soon as the latter have caught the hay between their counter-pressing surfaces it is desirable to clear the rake-teeth from the hay and avoid entanglement therewith; and, since the endless aprons, at their juncture, proceed upward in tangent planes, the rake-teeth, continuing their circular movement, quickly withdraw their points inward away therefrom. The endless apron is best made with slats $d$ $d$ extending across from one endless chain to the other; and these cross-slats alternate in position with the teeth $f$ $f$ of the revolving rake, being situated closely before and behind the same in the simultaneous progress of the two at the bottom turn of the endless apron. The slats thereby serve effectually to strip the hay from the rake-teeth as the latter are withdrawn from the path of the endless apron, thus preventing any entanglement or obstruction which the rake-teeth might otherwise cause. The rake or gathering-teeth are essential only in connection with the rear endless apron D, which takes up the hay from the ground; but I have represented them, also, in connection with the front endless apron C, since they may be there employed, though not necessarily, because the rear endless apron takes up whatever is left by the front apron, which is not intended to take up the mass of the hay. Either the front or the rear endless apron may have an elastic self-adjusting movement toward and from the other, or both may have such a movement. I have represented in the drawing only the forward apron as thus provided, having extensible conducting-gear S for receiving its motion from its driving-wheels B B. Instead of the extensible gear, as represented in Fig. 1, a different means of transmitting the motion from the driving-wheels to the adjustable endless apron may be employed, substantially as shown in Fig. 7. The connection is made by a positively-moving band-chain, S, running over rag-wheels $s$ and $t$, respectively, on the shaft or journal of each driving-wheel and on the lower shaft of the endless apron. The position of the latter is nearly directly over the former, so that the self-adjusting vibratory movement of the endless apron forward and backward may take place and yet its shaft remain at equal distances, or nearly so, from the shaft or journals of the driving-wheels. Instead of employing mere discharge-boards or guides to deliver the hay or grain from the endless aprons to the cart or wagon, I now cause the endless aprons themselves to continue forward to a proper position over the place of delivery. This is accomplished either by bending the main endless apron itself (as C, in Fig. 1) around pulleys or rollers L and M, at the top, from which its direction may extend forward, at any desired angle or inclination, to a terminal pair of pulleys or rollers, N, at the forward extremity; or by using an auxiliary extension apron, E, continuing forward from the top of the main endless apron, (as D, in the same figure,) the rear shaft P of the said exterior apron having rag-wheels $p$ $p$ to receive belt-chains I I, which also pass around rag-wheels $o$ $o$ on the upper shaft of the main endless apron, or other equivalent gear-connection for transmitting the motion from the main to the auxiliary endless apron. This extension apron also passes round pulleys or rollers Q Q on the forward extremity. The two methods of extension above set forth may properly both be employed, each in the connection shown, in one machine. The upper pulleys O O of the rear endless apron D and the top pulleys L L of the front endless apron C have their shafts or journals mounted on respective standards $a$ $a$ projecting upward from the main frame A of the machine; and the under pulleys M M at the bend of the endless chain C may be supported by brace-bearings $n$ $n$ secured to the forward standards $a$ $a$. The rear rag-wheel shaft P of the extension endless apron E may likewise be mounted in rigid extension bars $q$ $q$ secured to the rear standard $a$ $a$. These main standards are elastic, or otherwise allow an elastic self-adjusting movement of the endless aprons toward and from each other at the top, as in my former Letters Patent. The supporting-arms $c$ $c$ and $e$ $e$ of the apron-extensions are pivoted respectively on the shaft of the pulleys L L and the shaft P, so that they may be adjusted to different angles thereon, by which the forward extremities of the apron-extensions may be raised or lowered, for the purpose of delivering the hay at various heights as the load on the cart or wagon is more and more built up. In order to effect this adjustment curved supporting-braces R R are pivoted to the lower extension arms $e$ $e$, at the proper distance forward from the journals, or joints of the same are provided with ratchet notches which engage with sustaining-pins or staples $r$ $r$ on the forward standards $a$ $a$, as shown in Fig. 1. By raising these braces a little, so as to disengage their notches from the staples, the apron-extensions may be lowered so far as desired. Then, as the load is built up, the attendant, by simply drawing forward the braces occasionally, raises the aprons to the required height. This is a convenient device for the purpose, but other arrangements may be substituted therefor. The arms $e$ $e$ of the upper apron-extension are supported by, and their movements made correspondent with, the arms $e$ $e$ of the lower apron-extension by means of bars T T, connecting the forward ends of the said arms respectively, or by equivalent means; and the distance apart may be made adjustable by slots $n$ $n$ in the said bars, in which the connecting-bolts or pins of one set of arms may be secured by set-screws.

The mode of constructing the endless aprons, or of connecting the cross-slats $d$ $d$ with the endless chains $b$ $b$, is shown in Figs. 5 and 6. The alternate links $v$ $v$ of the endless chains are made of sheet metal; and to these links, at the desired intervals, the flattened ends of metallic (preferably sheet metal) sockets $w$ $w$ are secured by single rivets $y$ $y$. Into these sockets the ends of the (generally wooden) cross-slats are inserted, and are held therein by rivets $z$ $z$, or mere indentations in the metal. This is a simple and cheap construction; and, while the parts are thereby securely united, all the required freedom of movement among themselves is given to the same.

The tongue or pole V of the machine is conveniently attached to the axle W of the cart or wagon by a staple or eye and hook, as shown in Fig. 1. In connection with this attachment I employ a self-disengaging device for disconnecting the machine from the cart or wagon by simply backing the latter a little distance. This device consists of a drag-bar, X, hinged or pivoted to the tongue near the forward end thereof, so that it will turn backward, but not forward, from a vertical position, and being of such a length that its lower end will drag on the ground and keep it in an inclined position ordinarily, as indicated by the red lines in Fig. 1; but, on backing the cart or wagon, it will be brought into a vertical or upright position, as shown in the same figure, and thereby will lift the tongue sufficiently to disconnect it from the draft-hook, as represented.

What I claim as my invention, and desire to secure by Letters Patent, is—

1. The revolving rake or rakes with yielding or elastic teeth, in combination with the positively-actuated endless aprons C D, substantially as and for the purpose herein specified.

2. The forward extensions of the positively-actuated co-operating endless aprons C D, said extensions being adjustable to different heights or angles, and moving together, substantially as and for the purpose herein set forth.

The specification of my improved machine for the purposes named signed by me this 10th day of May, 1869.

HORACE BAKER.

Witnesses:
CH. THOS. WHITE,
F. A. CHAMBERLIN.